Figure 1:
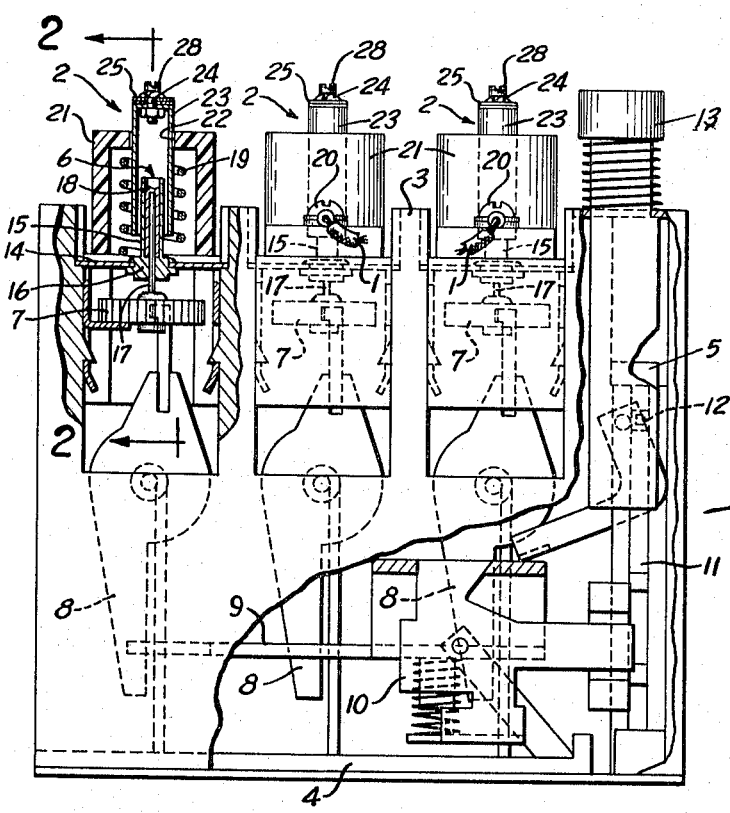

April 11, 1967

R. RUSSO 3,313,900

OVERLOAD PROTECTION DEVICE WITH HEAT SHIELD INTERPOSED
BETWEEN HEATER AND THERMAL ELEMENTS

Filed Dec. 16, 1965

INVENTOR
ROLAND RUSSO

BY
Andrus & Starke
ATTORNEYS

United States Patent Office 3,313,900
Patented Apr. 11, 1967

3,313,900
OVERLOAD PROTECTION DEVICE WITH HEAT SHIELD INTERPOSED BETWEEN HEATER AND THERMAL ELEMENTS
Roland Russo, South Euclid, Ohio, assignor to A. O. Smith Corporation, Milwaukee, Wis., a corporation of New York
Filed Dec. 16, 1965, Ser. No. 514,253
7 Claims. (Cl. 200—124)

This invention relates to an overload protection device and more particularly to an overload protection device of the fusible alloy type which includes a mechanism for automatically compensating for variations in ambient temperature.

Overload relays of the fusible alloy or solder pot type normally include a switch biased toward open position and adapted to be held in closed position by a trip mechanism including a member which is normally held against movement by the fusible alloy or solder pot connection. A heating element connected in series with the load is located adjacent the solder pot connection and under overload conditions, the heating element will melt the solder or alloy to thereby release the member and open the switch. Upon opening of the switch, the circuit is interrupted and subsequently the fusible alloy connection cools and soldifies to again render the trip mechanism effective to hold the switch in the closed position upon manual resetting.

Fusible alloy or solder pot overload relays do not normally compensate for ambient temperature changes and as a result, the sensitivity of the device to overload current conditions is increased upon a rise in ambient temperature and decreased upon a drop in ambient temperature.

The present invention is directed to an overload protection device of the solder pot or fusible alloy type which includes a mechanism for automatically compensating for variations in ambient temperature. The overload protection device includes a ratchet wheel which is carried by a shaft normally fixed against rotation within a soldered mass or fusible alloy. A spring-loaded switch mechanism is coupled to the ratchet wheel and normally held closed. Connected in series with the load is a heating coil which surrounds the fusible element or solder pot and in the presence of overload current, the solder melts to release the rachet mechanism and allow the switch to move to the disconect positon.

According to the invention, a heat insulating clyindrical shield is located in spaced relation between the heating element and the solder pot. One end of the shield is carried by a thermostatic bi-metallic element which is responsive to variations in the ambient temperature. The bi-metallic element is arranged so that on an increase in ambient temperature, the element bends in a direction to move the shield inwardly onto the solder pot to thereby reduce the exposure of the solder pot to the heating element. On a decrease in ambient temperature, the bi-metallic element bends in the opposite direction to move the shield outwardly of the solder pot to thereby increase the exposure of the solder pot to the heating element.

Thus, the present invention provides a simple and inexpensive automatic compensating device for insuring response of the solder pot relay upon a predetermined overload current in the heater, regardless of variations in ambient temperature. The insulating shield is carried by the bi-metallic element and is moved in relation to the solder pot and heating element in accordance with variations in the ambient temperature to thereby increase and decrease the exposure of the solder pot to the heating element.

Other objects and advantages will appear in the course of the following description.

The drawings illustrate the best mode presently contemplated of carrying out the invention.

Figure 2:
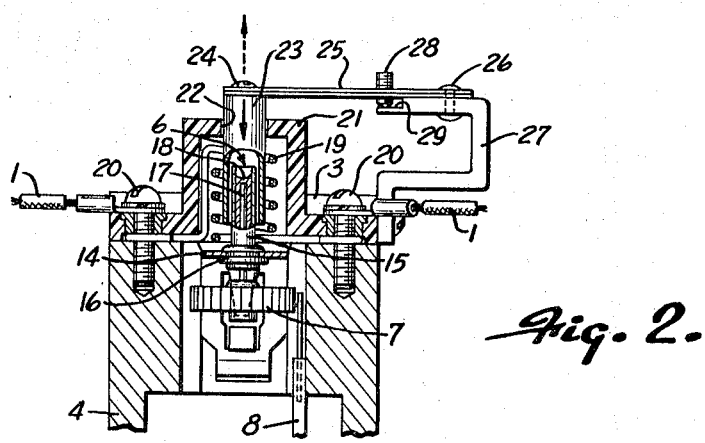

In the drawings:

FIG. 1 is a side elevation of an overload protection device constructed in accordance with the present invention with parts broken away in section; and FIG. 2 is a section taken along lines 2—2 of FIG. 1 and showing the solder pot assembly and insulating shield.

Referring to the drawing, the illustrated embodiment of the invention is a thermal overload unit for controlling a three-phase alternating current motor and the like, not shown, in response to the current flow in three input power lines 1 constituting the power lines to the motor. The illustrated overload unit is similar to that described in the copending application of Eduard W. Isler entitled Mechanical Reset Apparatus, Serial No. 493,741, filed October 7, 1965 and assigned to a common assignee and generally includes three similar current sensitive sections 2, one section for each of the three power lines 1 which are broken and connected through the corresponding sections. Generally, the overload unit includes an upper housing 3 and a lower housing 4 releasably interconnected with a control switch 5 mounted to one end of the assembled housings 3 and 4. A solder pot assembly 6, particularly forming the subject of this application, is mounted in each of the sections 2 and generally includes a locking ratchet wheel 7 holding a pivotally mounted lever 8 in a standby position. A motion transfer plate 9 is slidably mounted within the housing sections 3 and 4 and is connected at one end to the levers 8 and terminates at the opposite end in a coupling and guide member 10 which is pivotally mounted for movement with plate 9. A switch operator 11 is slidably mounted within the housing 3 and connected to the coupling and guide member 10 and to a switch arm 12 of the adjacent switch 5 for opening and closing thereof in accordance with the positioning of member 10. Once tripped, the device must be reset through the use of a reset lever assembly 13 which is shown projecting downwardly through the top of the housing section 3 and coupled to the coupling and guide member 10 for moving of the guide member 10 and the switch operator 11 only in the direction of plate 9. The guide member 10 moves perpendicularly to the plate when assembly 13 is released.

For a more detailed description of the trip and reset mechanism and its operation, reference may be made to the above identified copending application. The operation of the device is herein briefly described. The ratchet wheel 7 holds the lever 8 in a standby position with the coupling member 10 located to maintain the switch 12 in an operative position whereby power flows through the lines 1 to the motor or the like, not shown. If for any reason an abnormal current condition is created, the solder pot assembly 6 responds to the heating effect of the increasing current to release the ratchet wheel 7. Consequently, the spring loaded levers 8 rotate to the tripped position moving the switch plate 9. The coupling member 10 pivots to reposition the switch operator 11 and actuate the switch 5 of the control circuit.

The solder pot assembly 6 includes a generally U-shaped clip member 14 having a central opening and a tube 15 is located within the opening and is provided with a suitable bearing base 16 disposed in engagement with the inner surface of the clip member 14. A shaft 17 connected to ratchet wheel 7 projects upwardly through the tube 15 and is held within the tube by solder 18 or other low melting point alloy.

Surrounding the tube 15 is a coiled heating element 19 and the element is connected by end lead terminals to lines 1 to provide a heat source for melting of the solder in the presence of abnormal current conditions in the lines 1 to thereby release the ratchet wheel shaft 17 and the attached ratchet wheel 7. The connections to line 1 are shown as simple screw-type connections 20 whereas in actual practice separate terminals, such as shown in the copending application of Eduard W. Isler and entitled Space Saving Electrical Terminal, filed February 11, 1965, Serial Number 431,796, are preferably employed.

In accordance with the invention, an insulating cap 21 encloses the solder pot assembly 6 and is secured to the housing through the screws 20, or other suitable means. The cap 21 is provided with a central opening 22 and a generally cylindrical shield 23 is located within the opening 22 and is arranged in spaced relation to both the tube 15 and the heating element 19. The outer end of the shield 23 is secured by a bolt 24 to one end of a bimetallic thermostatic element 25, while the opposite end of element 25 is secured by bolt 26 to a bracket 27 attached to the cap 21. As best shown in FIG. 2, a set screw 28 is threaded within an opening in the element 25 and bears against a shoulder 29 formed on the bracket 27.

The shield 23 is movable axially between the heating element 19 and solder pot assembly 6 and serves to vary the heating effect of the element on the solder pot assembly.

Shield 23 can be constructed of a non-metallic heat insulating material such as glass, bone fiber, plastic and the like or, as the shield is not in direct contact with either the heating element or the solder pot, it can also be constructed of metal.

The bi-metallic element 25 is arranged so that it will bend or deflect on an increase in temperature to move the shield 23 inwardly, in the direction of the solid arrow in FIG. 2, to thereby increase the enclosure of the tube 15 and correspondingly decrease the portion of the tube which is exposed to the heating element 19. On a decrease in ambient temperature, the bi-metallic element 25 will move the shield outwardly, in the direction of the dotted arrow in FIG. 2, to thereby decrease the shielding effect on the tube 15 and increase the portion of the tube exposed to the heating element 19. Thus, the bi-metallic element in combination with the shield 23 insures that the overload protection device will respond to a given overload current in the heating element 19 regardless of variations in the ambient temperature.

The set screw 28 provides an initial adjustment to position the shield 23 at the desired reference level. For example, the set screw 28 will be adjusted at a factory reference level for an ambient temperature of approximately 23° C. and in service, the shield will move in and out with respect to the solder pot as the atmospheric temperature varies above and below 23° C.

Various modes of carrying out the invention are contemplated as being within the scope of the following claims particularly pointing out and distinctly claiming the subject matter which is regarded as the invention.

I claim:

1. A protective device for an electric circuit, comprising a movable switch member adapted to be connected in electrical circuit and biased toward a circuit opening position, latching means operably connected to said switch member and settable upon movement of said switch member to a circuit closing position to hold said switch member in said circuit closing position, said latching means including a stationary heater adapted to be connected in the electrical circuit to be protected and including a thermal device exposed to said heater and responsive to a given elevated temperature to trip said latching means and permit said switch member to move to the circuit opening position, a heat shield disposed between the heater and the thermal device, means mounting the heat shield for movement with respect to the heater and to the thermal device, thermal responsive means movable in response to changes in the ambient temperature and connected to the shield for moving the shield to thereby vary the exposure of said thermal device to said heater in accordance with variations in the ambient temperature, and heat insulating means disposed between the heater and the thermal responsive means and insulating said thermally responsive means from said heater.

2. The device of claim 1 in which the thermal responsive means is a bi-metallic element having one end connected to a fixed support and having the opposite end connected to the shield, said bi-metallic element characterized by the ability to deflect and move the shield in accordance with variations in ambient temperatures.

3. The structure of claim 1 in which the thermal device includes a low melting point alloy arranged to melt when subjected to a predetermined temperature developed by said heater to thereby trip said latching mechanism.

4. The device of claim 2 in which the heater is a spirally wound electrical heating element and the shield is a cylindrical member disposed in spaced relation between the heating element and the thermal device, one end of said shield being connected to the bi-metallic element and the opposite end of the shield being free of support and disposed between said heating element and said thermal device.

5. The device of claim 2, in which the element is arranged to deflect in one direction and move the shield into increased shielding relation with the heater and thermal device on an increase in ambient temperature and arranged to deflect in the opposite direction and move the shield into decreased shielding relation with the heater and thermal device on a decrease in ambient temperature.

6. The device of claim 2, and including means for manually adjusting the position of the bi-metallic element to thereby position the shield at an initial reference level with respect to the thermal device.

7. The protective device of claim 1, in which said heat insulating means comprises an insulating cover surrounding the heater and having an opening therein, said shield extending within the opening and said thermal responsive means is located on the exterior of the cover and is connected to the outer end of the shield.

References Cited by the Examiner

UNITED STATES PATENTS 2,803,722  8/1957  Kuhn _____ 200—124

FOREIGN PATENTS 428,011  5/1935  Great Britain.

BERNARD A. GILHEANY, *Primary Examiner.*

H. B. GILSON, *Assistant Examiner.*